United States Patent [19]

Basin et al.

[11] 3,829,978
[45] Aug. 20, 1974

[54] WORKTABLE FOR POSITIONING WORKPIECES IN MEASURING DEVICES TO CHECK DIMENSIONS

[76] Inventors: Naum Genrikhovich Basin, ul. Borisa Galushkina, 12, kv. 90; Alexei Viktorovich Vysotsky, ul. Argunorskaya, 4, kv. 22; Anatoly Petrovich Kurochkin, ul. Krarehenko, 4 korpus 1, kv. 91; Ura Julievna Okun, Leningradskoe Shosse 7/2, korpus 1, kv. 304, all of Moscow, U.S.S.R.

[22] Filed: Sept. 18, 1972

[21] Appl. No.: 290,143

[52] U.S. Cl.................. 33/174 TA, 33/1 M, 269/71
[51] Int. Cl........................... B23q 3/04, G01b 5/20
[58] Field of Search..... 33/174 L, 174 TA, 174 TC, 33/174 TD, 1 M; 269/60, 71; 51/240 R, 240 A, 240 T

[56] References Cited
UNITED STATES PATENTS
3,270,423  9/1966  Birrell et al. ................... 33/174 TA
3,524,261  8/1970  Klink ............................. 33/174 TA Primary Examiner—Roy Lake
Assistant Examiner—Neil Abrams
Attorney, Agent, or Firm—Waters, Roditi, Schwartz & Nissen

[57] ABSTRACT

A worktable with means for inclining the worktable and for positioning workpieces in devices for controlling linear dimensions. The worktable consists of three plates mounted one upon another. The upper plates are mounted on ball supports and equipped with the mechanisms for precise adjustment in the horizontal plane along two mutually perpendicular axes and for rotation in two mutually perpendicular vertical planes.

The ball supports of each plate serve as two rectilinear guides with balls confined between them, with one of the guides of each plate having provision for adjustment in the vertical plane to rotate the upper plate about the balls of the other guide of the same plate.

This worktable is of simple design and can be used in devices for controlling the configuration and the mutual position of the surfaces of the workpieces to be controlled.

5 Claims, 7 Drawing Figures

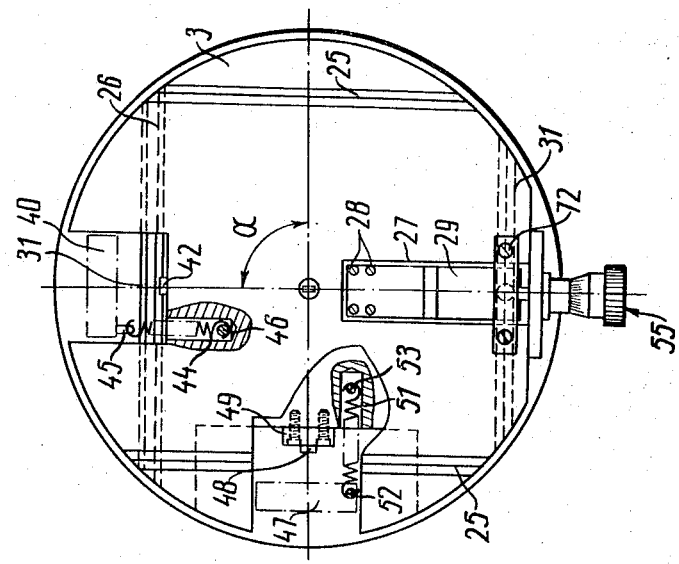
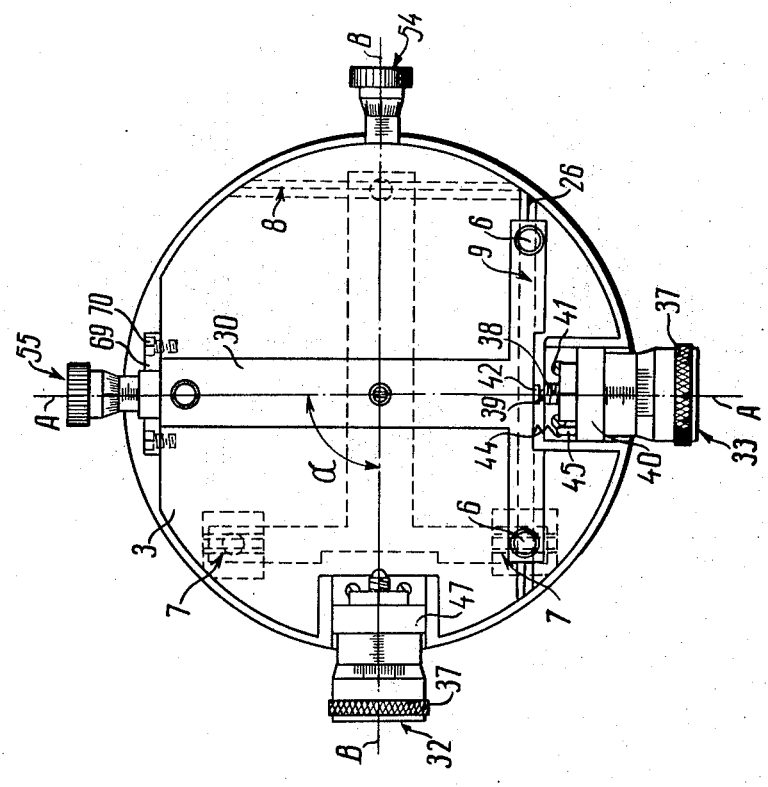
FIG. 6
FIG. 5

WORKTABLE FOR POSITIONING WORKPIECES IN MEASURING DEVICES TO CHECK DIMENSIONS

The invention relates to the means for measuring of linear dimensions and is designed for positioning and orienting in space the workpiece to be measured, in particular, in devices for controlling the shape and mutual arrangement of surfaces.

While controlling the shape of surfaces, for example, the out-of-roundness of cylindrical workpieces, it is necessary to set a workpiece on a worktable of a device so that the workpiece axis should coincide with rotation axis of the precision rotation spindle or worktable. For this purpose, the worktable, firstly, must have an opportunity, to move in the horizontal plane and, secondly, to incline in two vertical planes ensuring the positioning of the controlled workpiece with its axis held parallel to the rotation axis of the spindle.

Known in the art are worktables for positioning workpieces in devices for controlling the shape of workpieces in which provision is made for both adjustment about two mutually perpendicular axes in the horizontal plane and inclination in two vertical planes (Cf. for example U.S. Pat. No. 3270423, Cl. 33–174).

This worktable is provided with three plates located one upon another, the lower one acting as a base and two other being mounted on ball supports and equipped with mechanisms for precise adjustment in the horizontal plane along two mutually perpendicular axes and for inclination in two mutually perpendicular vertical planes.

However, this worktable employs separate guides of different types which complicates its design. Thus, used as guides are slot grooves for rectilinear adjustment, and a spherical support for inclination in two vertical planes, the support requiring accurate and careful fabrication which ensures, in the main, a precise positioning of the tested workpiece about the spindle axis. Besides, machining and repairing the outer and inner spherical surfaces, being labour-consuming processes, result in higher costs of the worktable.

The object of the invention is to provide such a worktable for positioning workpieces in devices for controlling linear dimensions employing one and the same guides both for adjustment in the horizontal plane and for the inclination of plates in the vertical planes, thus making the worktable simpler in design, inexpensive in fabrication and repairs, accurate and reliable in operation.

This object is accomplished in a worktable for positioning workpieces in devices for controlling linear dimensions comprising three plates located one upon another, the lower one acting as a base and the other two being mounted on ball supports and equipped with mechanisms for precise adjustment of these plates in the horizontal planes about two mutually perpendicular vertical planes; according to the invention the ball supports of each plate, being the two rectilinear guides with the balls confined between them, are located at both sides of the worktable centre parallel to each other having the balls arranged at one side between the V-grooves formed on the surfaces of the adjacent plates facing each other, and at the other side between the V-groove formed in the upper plate and the flat surface of the intermediate plate connected with the underlying plate in which provision is made for adjustment in the vertical plane by utilising the said mechanism for precise inclination to rotate the upper plate about the balls of the other guide of the same plate, with the guides of one plate being located at right angles with respect to the guides of the other plate.

Due the rectilinear ball V-guides, acting as supports for adjusting the plates, and due to the flat surface of the intermediate plate serving as the lower support surface of one or the two guides, with provision being made for the intermediate workpiece to adjust in the vertical plane which, in doing so, acts via the guide ball on the upper plate making each of the plates rotate about the balls of the other guide of the same plate. Thus, use is made of the same guides both for performing rectilinear adjustment and for inclining the relevant plate in the vertical plane which considerably simplifies the worktable design and lowers its cost.

A further characteristic feature of the invention consists in that the intermediate workpiece serves as a lever connected with the underlying plate, the former having a spring pivot and a wedge portion mounted on its loose end whose upper plane acts as a support for the balls, with the mechanism for precise inclination being a micrometric screw fastened to the underlying plate, the spherical cap of the screw contacting the lower plane of the lever wedge portion.

Another characteristic feature of the invention is that one guide of each plate whose balls act as a rotation axis, comprises two balls, and the other guide whose balls rest on the lever, contains one ball.

In addition, the invention is characterised by the balls of the two guides of each plate being located in a common cage.

The above-mentioned design features and peculiarities of the invention permit utilising one and the same guides both for rectilinear adjustment and for inclination. Moreover, the design of the guides is simple providing for easy and precise fabrication and repairs. The mechanisms for inclining the worktable are also simple and inexpensive in fabrication.

All this makes the worktable, according to the invention, economical, precise and reliable.

Further features of the invention will become apparent from the following detailed description of the worktable for positioning workpieces to be controlled in devices for controlling linear dimensions which is to be read with reference to the accompanying drawings, in which:

FIG. 5 is a top view of the intermediate plate with the upper plate removed;

FIG. 6 is a sectional view on the line VI—VI of FIG. 2;

Figure 1:
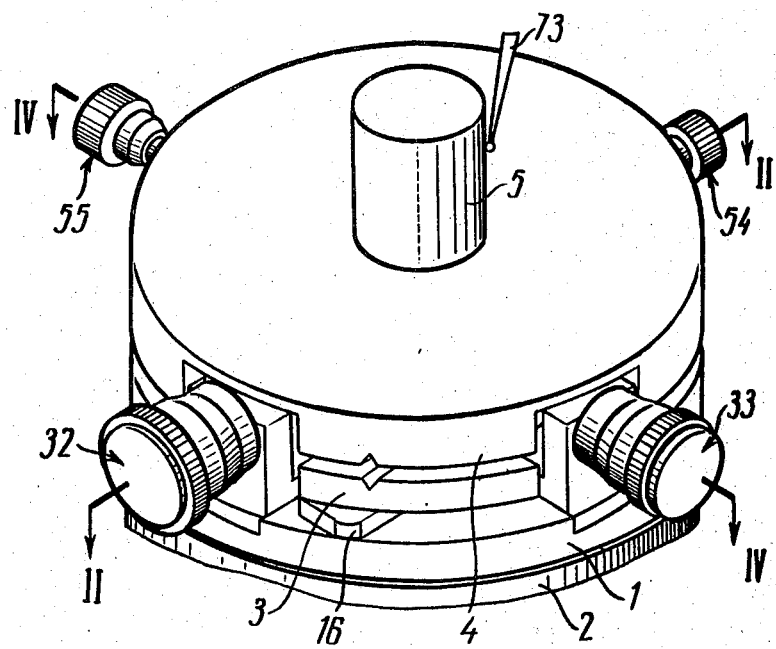
FIG. 1 is a perspective view of the worktable, according to the invention, positioned on which are the workpiece to be controlled and the measuring cap of the device brought in contact with the workpiece surface.

The worktable for positioning workpieces in devices for controlling linear dimensions comprises three plates located one upon another. The lower plate 1 (FIG. 1) serves as a base mounted on the end of the precision rotation spindle 2. The intermediate plate 3 being located on the base, supports, in turn, the upper plate 4 on which the tested workpiece 5 is positioned.

The upper plate 4 and the intermediate plate 3 are mounted on ball supports which are located between the upper plate 4 and the intermediate plate 3, and the intermediate plate 3 and the base 1, respectively.

The ball supports of each plate act as two rectilinear guides with the balls 6 (FIG. 2) confined between them, the guides being located at both sides of the worktable center and held parallel to each other.

Figure 4:
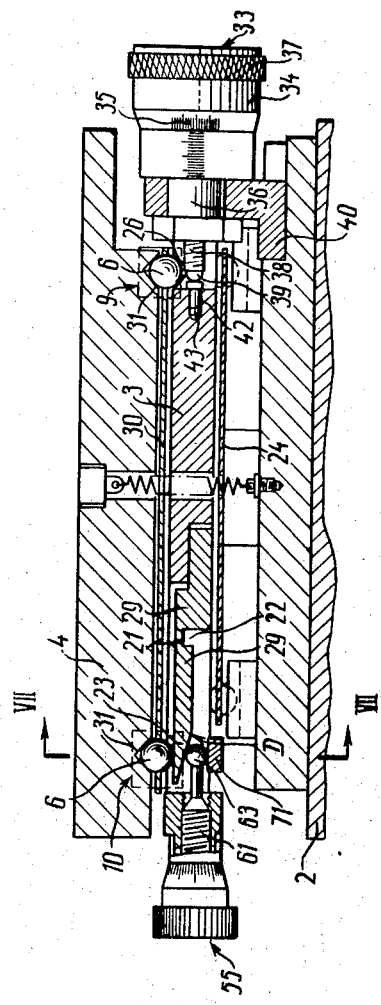
FIG. 4 is a sectional view on the line IV—IV of FIG. 1.

Disposed between the plate 3 and the base 1 are the guides 7 and 8 which ensure the adjustment of the plate 3 in the horizontal plane along the axis A—A (FIG. 3), the guides 9 and 10 (FIG. 4) are located between the plates 4 and 3 providing the adjustment of the upper plate 4 in the horizontal plane along the axis B—B (FIG. 5) which is perpendicular to the axis A—A. In order to ensure the adjustment of the plates 3 and 4 in the horizontal plane along the two mutually perpendicular axes A—A and B—B, the guides 9 and 10 are located at right angle $\alpha$ with respect to the guides 7 and 8.

The plates 1, 3 and 4 (FIG. 2) are combined in a single unit by an extension spring 11 which is disposed in the coaxial apertures 12 formed in the plates 4 and 3. One end of the spring 11 is connected with the plug 13 located in the upper plate, and the other end is joined with the screw 14 screwed into the base 1.

Two pads 16 with the rectilinear V-grooves 17 in them are fastened co-axially by means of screws 15 (FIG. 3) to the surface of the base 1. Fastened by means of screws 18 to the base 1 is the intermediate plate acting as lever 19 (FIG. 2) connected to the base 1 with provision made for adjustment in the vertical plane perpendicular to the direction of the V-grooves 17.

For adjustment in the vertical plane the lever 19 has a spring pivot 20 formed by its thin portion 21 made at the expense of the slot 22 in the lever body. The flat upper surface of the lever 19 serves as a support for the balls 6. Two balls 6 are located in the V-grooves of pads 16 and one ball 6 is located on the flat surface of the lever 19.

The balls 6 are enclosed in a laminated T-cage 24.

Held parallel to each other at both sides of the worktable centre on the surface of the intermediate plate 3 facing the base 1 are the rectilinear V-grooves 25 similar to the grooves 17 of the pads 16.

The intermediate plate 3 is mounted on the base 1 so that one of the V-grooves 25 is located above the V-groove 17, and the other of the V-grooves 25 — over the lever 19, with the balls 6 being confined between the V-grooves 25 and 17 and the V-groove 25 and the lever 19, i.e., the guide 7 is formed by the V-grooves 25 and 17, and the guide 8 is formed by the V-groove 25 and the lever 19. The rectilinear V-groove 26 (FIG. 5) similar to the grooves 17 and 25 of the guides 7 and 8 is formed on the upper surface of the intermediate plate 3 perpendicular to the direction of the rectilinear V-grooves 25 located on the lower surface of the same plate.

The intermediate plate 3 (FIG. 6) contains a slot 27 in which fastened by means of screws 28 perpendicular to the direction of the V-groove 26 is the intermediate plate made in the form of lever 29 (FIG. 4), similar to the lever 19, mounted so that it can be adjusted in the vertical plane perpendicular to the guide 9.

Located in the V-grooves 26 of the plate 3 are two balls 6 and in the upper plane of the lever 29 is one ball 6. The balls 6 are confined within the laminated T-cage 30 similar to the cage 24.

The rectilinear V-grooves 31 similar to the groove 26 of the intermediate plate 3 are held parallel to each other at both sides of the worktable centre on the lower plane of the upper plate 4 facing the intermediate plate 3.

The upper plate 4 is mounted on the intermediate plate 3 so that one of the V-grooves 31 is located over the V-groove 26 and the other V-groove 31 — over the lever 29, with the balls 6 being confined between the V-grooves 26 and 31, and the V-groove 31 and the lever 29, i.e., the guide 9 is formed by the V-grooves 26 and 31, and the guide 10 is formed by the V-groove 31 and the lever 29.

From the foregoing description it follows that the said guides 7 and 8 are arranged at right angle $\alpha$ to the guides 9 and 10, thus providing for precise adjustments of the upper plate 4 of the worktable along two mutually perpendicular horizontal axes A—A and B—B (FIG. 5).

These adjustments are accomplished by means of two mechanisms 32 and 33 (FIG. 1) for precise adjustments, each of them being a micrometric head which ensures precise adjustment; the head is not disclosed in the present description, since it is widely known and utilised in devices for controlling linear dimensions of the workpieces to be measured.

Each micrometric head is comprised of a drum 34 (FIG. 2) with a scale 35 calibrated on its side surface, a spindle 36 with a scale 36a on it, designed to fasten the head, an adjustment handle 37, a micrometric screw 38 with a spherical cap 39.

The micrometric head of the mechanism 33 (FIG. 4) designed to adjust the intermediate plate 3 together with the upper plate 4 is mounted on the bracket 40 which is fastened to the base 1 by means of screws 41 (FIG. 5). To constantly urge the intermediate plate 3 into contact with the spherical cap 39 of the screw spindle 38 through an anvil 42 which is pressed in an aperture 43 (FIG. 4) in the intermediate plate, a spring 44 is provided, one end of which is fastened to a pin 45 (FIG. 6) pressed into the bracket 40, and the other end is fastened to the pin 46 mounted on the intermediate plate 3.

The micrometric head of the mechanism 32 designed to adjust the upper plate 4 on the intermediate plate 3 is fastened to the bracket 47 (FIG. 2) and is turned by 90° in the horizontal plane with respect to the micrometric head of the mechanism 33 (FIG. 5).

The micrometric head of the mechanism 32 (FIG. 2) is brought in contact with the heel 48 mounted on the strip 49 fastened to the upper plate 4 by means of screws 50. The spherical cap 39 of this head is pressed against the heel 48 by means of spring 51, one end of which is fastened to the pin 52 fixed on the bracket 47, and the other end is fastened to the pin 53 fixed to the upper plate 4.

By rotating the handle 37 (FIG. 5) of the micrometric head 33, precise adjustment is obtained of the intermediate plate 3 together with the upper plate 4 along the guides 7 and 8 of the base 1 along the axis A—A, and by rotating the handle 37 of the micrometric head of the mechanism 32, the upper plate 4 moves along the intermediate plate 3 along the guides 9 and 10 along the axis B—B which is perpendicular to the adjustment direction of the intermediate plate 3 on the base 1. This provides the centring of the axis of a horizontal section of the workpiece 5 (FIG. 1) to be measured with respect to the axis of the rotation spindle 2.

Figure 2:
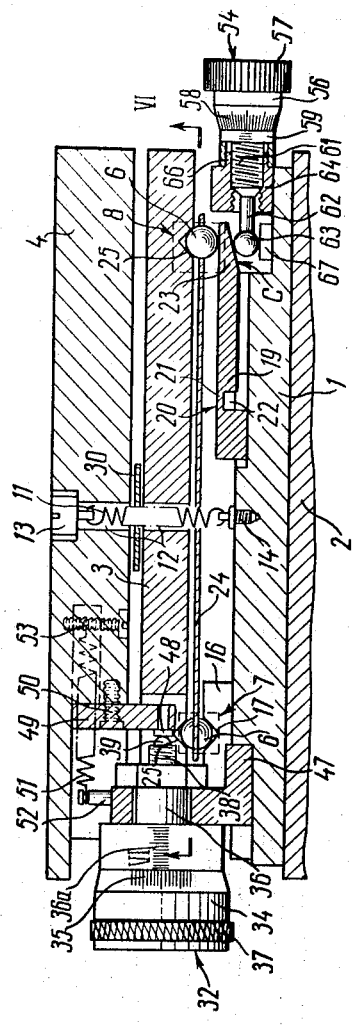
FIG. 2 is a sectional view on the line II–III of FIG. 1.
Figure 3:
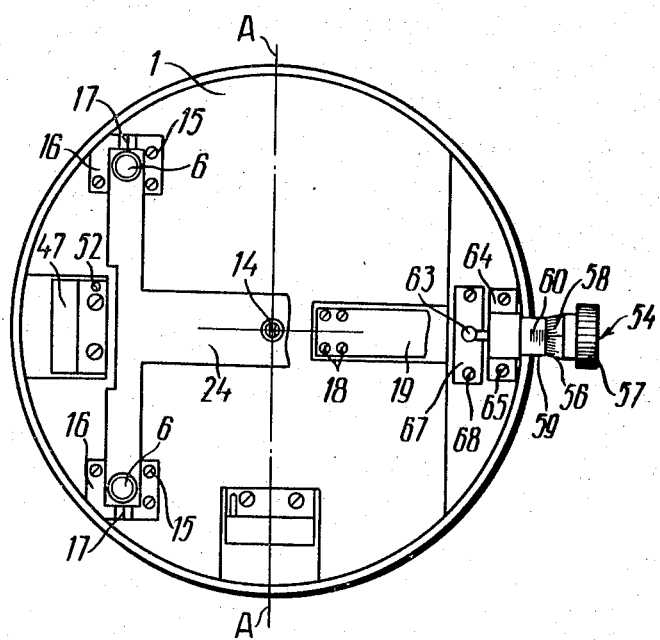
FIG. 3 is a top view of the base without the upper and intermediate plates and the mechanisms for rectilinear adjustment about mutually perpendicular axes.

The inclination of the plates 4 and 3 in the vertical mutually perpendicular planes is effected by two mechanisms 54 and 55 for precise inclination, each of them representing a micrometric head of familiar design consisting of a drum 56 (FIG. 3) with a handle 57 and a scale 58 calibrated on its side surface, a spindle 59 with a scale 60 located along its axis and a micrometric screw 61 (FIG. 2). Mounted on the end of the micrometric screw 61 is the cylindrical shank 62 with a spherical cap 63. The micrometric screw 61 of the micrometric head of mechanism 54 designed to incline the intermediate plate 3 together with the upper plate 4 in the vertical plane is screwed into the bracket 64 fastened to the base 1 by means of screws 65 (FIG. 3). The spindle 59 (FIG. 2) is made hollow with its inner surface placed on the abutment 66 formed in the bracket 64.

The spherical cap 63 of the micrometric screw 61 is supported by the pad 67 fastened to the base 1 by means of screws 68 (FIG. 3) and is brought in contact with the lower plane C (FIG. 2) of the wedge portion 23 of the lever 19. The pad 67 is intended to prevent the cylindrical shank 62 from deflection under the weight of the intermediate and the upper plates 3 and 4.

The micrometric head of the mechanism 55 (FIG. 5) designed to incline the upper plate 4 in the vertical plane perpendicular to the inclination plane of the intermediate plate 3 is fastened to the bracket 69 fixed to the intermediate plate by the screws 70.

Figure 7:
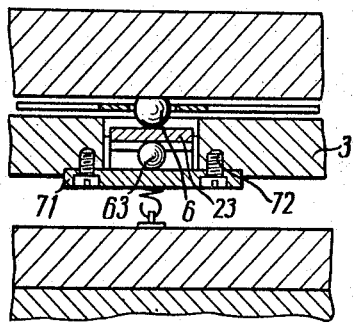
FIG. 7 is a sectional view on the line VII—VII of FIG. 4.

The spherical cap 63 (FIG. 4) of the micrometric screw 61 of this head is supported by the par 71 (FIG. 7) fixed to the intermediate plate 3 by means of screws 72 and is brought in contact with the lower plane D (FIG. 4) of the wedge portion 23 of the lever 29. The micrometric cap of the mechanism 55, as illustrated in FIG. 5, is turned by 90° in the horizontal plane with respect to the micrometric head of the mechanism 54, thus ensuring the inclination of the worktable upper plate 4 in two mutually perpendicular vertical planes.

While rotating the handle 57 (FIG. 2) of the drum 56, the micrometric screw 61 moving to or from the worktable centre depending on the direction of the screw rotation, acts upon the lower plane C of the wedge portion 23 of the lever 19. In doing so, the lever 19 rotates on the spring pivot 20 and acts upon the ball 6 which shifts the intermediate plate 3 with the upper plate 4 mounted on it in the vertical plane.

The intermediate plate 3 together with the plate 4 turns on the balls 6 of the guide 7.

The inclination of the upper plate 4 (FIG. 4) with respect to the intermediate plate 3 is accomplished by the micrometric head of the mechanism 55 in the same manner as has been described above. In doing so, the upper plate 4 turns on the balls 6 of the guide 9.

By selecting the inclination angle of the wedge portion 23 of the levers 19 and 29 and the pitch of the micrometric screw 61, it is possible to incline the worktable in the vertical planes by very small values, thus obtaining high accuracy in arranging the axis of the workpiece 5 parallel to the axis of the rotation spindle 2.

The precise positioning of the workpiece to be controlled on the worktable described above is effected in the following way:

The workpiece 5 (FIG. 1) to be controlled is positioned on the worktable and is centred as accurate as possible by eye. Then by rotating the spindle 2 of the device, the measuring cap 73 of the device is brought in contact with the surface of the workpiece 5 in the required section, with watch kept over the readout device or with the diagram of the profile plotted in polar coordinates on the diagram map which rotates in synchronization with the spindle (the readout device and the diagram map not being part of the invention are not shown in the drawings). If the readout device or the profile diagram indicate that the workpiece is positioned eccentrically, then by rotating the handle 37 of the micrometric heads of mechanisms 32 and 33, the worktable upper plate 4 adjusts along two mutually perpendicular horizontal axes A—A and B—B until the eccentricity of positioning the workpiece 5 with respect to the axis of the spindle 2 is reduced to minimum. This is followed by checking up the parallelism of the axis of the workpiece 5 and the rotation axis of the spindle 2. For this purpose, profiles of two workpiece sections located at the maximum distance one from the other are plotted down on one diagram map along the workpiece axis. The inclination of the workpiece axis with respect to the spindle axis is characterised by the distance between the centres of the plotted profiles. By rotating the handles 57 of the micrometric heads of mechanisms 55 and 54, the plates 3 and 4 incline in two mutually perpendicular vertical planes until the said distance between the centres of the newly plotted profiles of the same workpiece sections becomes minimal.

In this position the axis of the workpiece to be controlled is held parallel to the spindle axis. And again, if necessary, the upper plate 4 is adjusted in the horizontal plane by means of the micrometric heads of mechanisms 32 and 33, so that the axis of the workpiece to be controlled coincides with the rotation axis of the spindle.

The present invention does not confine itself to the described design embodiment, for example, the intermediate workpiece may be made not in the form of levers 19 and 29 employing the spring pivot 20, but in some other form allowing for adjusting the workpiece in the vertical direction for rotating each of the upper plates about the balls of one of its guides for rectilinear adjustment.

We claim:

1. A worktable for positioning workpieces in measuring devices for checking linear dimensions, comprising: a lower plate forming a base and mounted in a measuring device; an intermediate plate mounted on said base; an upper plate mounted on said intermediate plate for carrying the workpiece to be checked; coupling means interconnecting said plates; a mechanism for precise adjustment of said intermediate plate together with said upper plate in the horizontal plane along a first coordinate axis; a mechanism for precise adjustment of said upper plate in the horizontal plane along a second coordinate axis perpendicular to said first coordinate axis; a mechanism for precise inclination of said intermediate plate together with said upper plate in a first vertical plane; a mechanism for precise inclination of said upper plate in another vertical plane perpendicular to said first vertical plane; first ball supports located between said base and intermediate plates and forming two rectilinear guides with balls confined between them, said guides being located at both sides of the worktable center and parallel to each other for allowing adjustment of said intermediate plate together with said upper plate in the horizontal plane along said first co-ordinate axis by means of said mechanism for precise adjustment of the intermediate plate together with the upper plate one of said guides being adjustable in the vertical plane perpendicular to said guides by means of said mechanism for precise inclination of the intermediate plate together with the upper plate so as to turn said plates about balls of the other guide on said base and said intermediate plate; second ball supports located between said upper and intermediate plates and forming two rectilinear guides with balls confined between them, said guides being located at both sides of the worktable center parallel to each other and perpendicular to said guides on the intermediate plate and the base for allowing adjustment of said upper plate in the horizontal plane along said second co-ordinate axis by means of said mechanism for precise adjustment of the upper plate, one of said last-mentioned guides being adjustable in the vertical plane perpendicular to said last-mentioned guides by means of said mechanism for precise inclination of the upper plate so as to turn the latter about balls of the other guide on said upper and intermediate plates.

2. A worktable as claimed in claim 1 wherein each of said guides adjustable in a vertical plane is formed by an intermediate member connected to the respective underlying plate of each pair of said plates and inclinable in the vertical plane by means of the respective mechanism for precise inclination, and by a V-groove provided in the respective overlying plate, each of said guides with the balls serving to turnably support the overlying plates being formed by the V-grooves made in the opposite surfaces of each pair of plates.

3. A worktable as claimed in claim 2 wherein said intermediate member is a spring-pivoted lever connected to the respective underlying plate and having on its free end a wedge portion whose upper plane serves as a support for balls, the mechanism for precise inclination being a micrometer head fastened to the respective underlying plate and having a screw spindle with a spherical point in contact with the lower plane of said wedge portion of the lever.

4. A worktable as claimed in claim 3 wherein one of the guides of each plate whose balls serve as a support of turning, contains two balls and the other guide contains one ball supported by the lever.

5. A worktable as claimed in claim 1 wherein the balls of the guides of each plate are located in a common cage.

* * * * *